United States Patent [19]
Seki et al.

[11] Patent Number: 5,698,929
[45] Date of Patent: Dec. 16, 1997

[54] VIBRATION WAVE DRIVEN MOTOR AND METHOD OF PRODUCING SAME

[75] Inventors: Hiroyuki Seki, Urawa; Atsushi Kimura, Yokohama; Yoshifumi Nishimoto, Yokohama; Yutaka Maruyama, Yokohama, all of Japan

[73] Assignee: Canon Kabushiki Kaisha, Tokyo, Japan

[21] Appl. No.: 70,843

[22] Filed: Jun. 3, 1993

[30] Foreign Application Priority Data

Jun. 17, 1992 [JP] Japan ..................... 4-157837

[51] Int. Cl.$^6$ ........................................ H01L 41/08
[52] U.S. Cl. .......................................... 310/323
[58] Field of Search ........................ 310/328, 323, 310/346; 346/75

[56] References Cited

U.S. PATENT DOCUMENTS

| | | | |
|---|---|---|---|
| 3,441,754 | 4/1969 | Heny | 310/346 |
| 3,721,841 | 3/1973 | Wilson | 310/351 |
| 4,426,031 | 1/1984 | Halasz | 228/121 |
| 4,610,426 | 9/1986 | Brandner | 310/346 U X |
| 4,649,311 | 3/1987 | Mukobjima et al. | 310/323 |
| 4,703,656 | 11/1987 | Bhardwaj | 73/644 |
| 4,825,117 | 4/1989 | Thomas, III et al. | 310/346 |
| 4,885,498 | 12/1989 | Wakita | 310/346 X |
| 4,964,091 | 10/1990 | Cook | 310/346 X |
| 5,128,580 | 7/1992 | Maeno et al. | 310/323 |
| 5,140,214 | 8/1992 | Kimura et al. | 310/323 |
| 5,155,407 | 10/1992 | Kimura et al. | 310/323 |
| 5,180,941 | 1/1993 | Seski et al. | 310/323 |
| 5,192,890 | 3/1993 | Kimura et al. | 310/323 |
| 5,195,373 | 3/1993 | Light et al. | 73/632 |
| 5,265,316 | 11/1993 | Ikeda et al. | 29/25.35 |
| 5,325,012 | 6/1994 | Sato et al. | 310/346 X |

FOREIGN PATENT DOCUMENTS

| | | |
|---|---|---|
| 0530822A2 | 3/1993 | European Pat. Off. . |
| 3155375 | 7/1991 | Japan . |

*Primary Examiner*—Mark O. Budd
*Attorney, Agent, or Firm*—Fitzpatrick, Cella, Harper & Scinto

[57] ABSTRACT

A vibration wave driven motor includes a vibration member which vibrates in response to an applied electrical signal, a rail-shaped stator having a recess formed thereon, a movable base integral with an elastic element, a pair of rollers, one of which engages the recess on the stator, and a pressing spring forcing the vibration member, the stator, and one of the rollers into contact.

18 Claims, 5 Drawing Sheets

VIBRATION WAVE DRIVEN MOTOR AND METHOD OF PRODUCING SAME

BACKGROUND OF THE INVENTION

1. Field of the Invention

The present invention relates to a vibration wave driven motor. Particularly, the present invention relates to a vibration wave driven motor having an elastic element which is provided in press-contact with a rail-shaped stator and in which a traveling wave is formed to move the elastic element along the rail-shaped stator, and a vibration wave driven motor having an elastic element and a piezoelectric element joined together by a molten-metal method. The present invention also relates to a method of producing such a vibration wave driven motor.

2. Related Background Art

Figure 5:
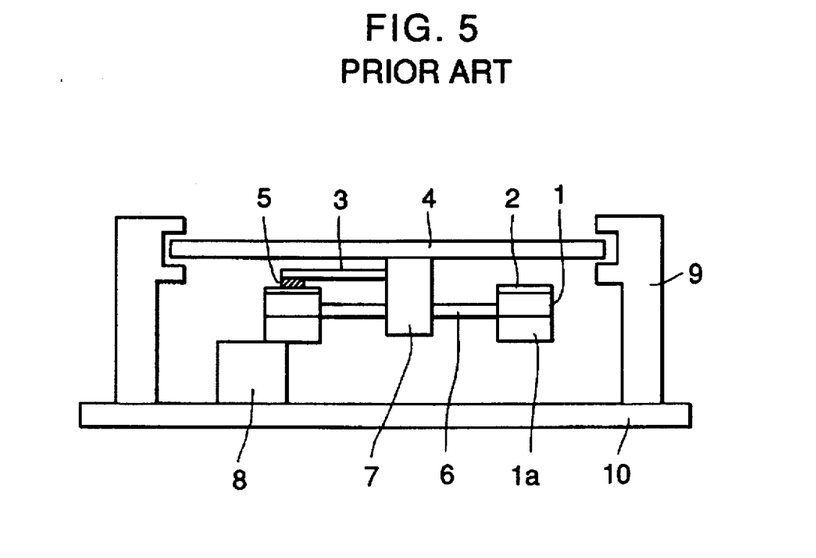
FIG. 5 is a sectional view of a conventional vibration wave driven motor.
Figure 6:
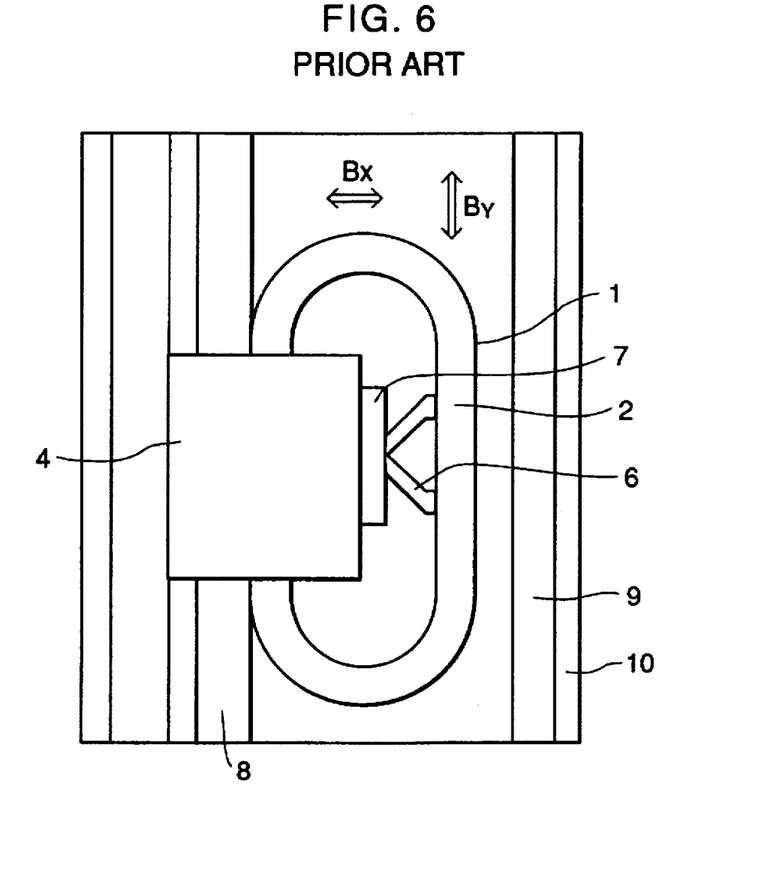
FIG. 6 is a plan view of the conventional motor shown in FIG. 5.

A conventional vibration wave driven motor of the above-described kind is shown in FIGS. 5 and 6. Referring to these drawings, the motor includes an elongated-elliptical (running-track-shaped) elastic element 1 made of a metal material and having a plurality of projections 1a on a sliding surface thereof. A piezoelectric element 2 is joined to the other major surface (upper surface, as viewed in FIG. 5) of the elastic element 1, so that when an alternating-current (AC) voltage is applied to the piezoelectric element 2, a traveling vibration wave is formed in the elastic element 1. Since the principles of the generation of such traveling vibration wave and the construction of such a piezoelectric element are known, they will not be described in detail. A traveling vibration wave is formed by applying an AC voltage having a time phase of 90° to a piezoelectric element comprising two sets of driving piezoelectric sub-elements that are shifted in position from each other by 90°. The motor also includes a rail-shaped stator 8 provided in frictional contact with the elastic element 1. Specifically, the stator 8 is fixed to a bottom plate 10 of a casing of the motor, and is kept in contact with the elastic element 1 by the force of a pressing spring 3 applied through a vibration insulating material 5 (such as a piece of felt). The elastic element 1 is supported by a supporting plate 6 having distal ends secured to portions of the elastic element 1, and a central portion secured to a supporting block 7.

The supporting block 7 is fixed to a movable base 4 so that the elastic element 1 is supported by the base 4 through the supporting plate 6 and the supporting block 7. The base 4 is supported by a pair of restricting members 9 for restricting the displacement of the base 4 in directions other than the direction of intended movement $B_Y$.

When a traveling vibration wave is formed in the elastic element 1, the elastic element 1 moves on the rail-shaped stator 8 relative thereto under a frictional force due to friction between the element 1 and the stator 8. The movement of the elastic element 1 causes the base 4 and other associated members 3, 5, 6 and 7 to also move along the restricting members 9 in the direction $B_Y$. The frictional drive force generated in this process acts on a portion of the elastic element 1. Since the portion of the elastic element 1 on which the frictional force acts is deviated from the portion of elastic element 1 at which it is supported, the elastic element 1 is subjected to moment for displacing the elastic element 1 in the $B_Y$ and $B_X$ directions.

Figure 7:
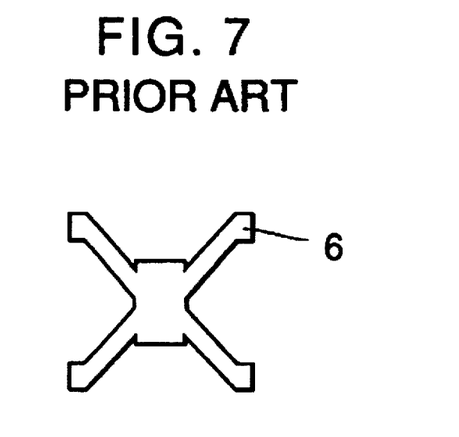
FIG. 7 is a plan view of an elastic supporting plate of the conventional motor shown in FIG. 5.

As shown in FIG. 7, the supporting plate 6 has an X-shaped planar configuration. The four distal ends of the supporting plate 6 are firmly joined to the inner peripheral portions of the elastic element 1 by spot welding or the like. The central portion of the supporting plate 6 is firmly clamped by the supporting block 7 fixed to the base 4. Therefore, even when the elastic element 1 is subjected to moment, the elastic element 1 is prevented from performing rotation or irregular movement due to looseness, and is able to perform smooth linear movement together with the base 4.

The motor is used, for example, to drive the printing head of a bubble-jet printer. In this case, the printing head is mounted to a carriage, not shown, set on the base 4 so that the printing head can perform linear reciprocation.

Figure 8:
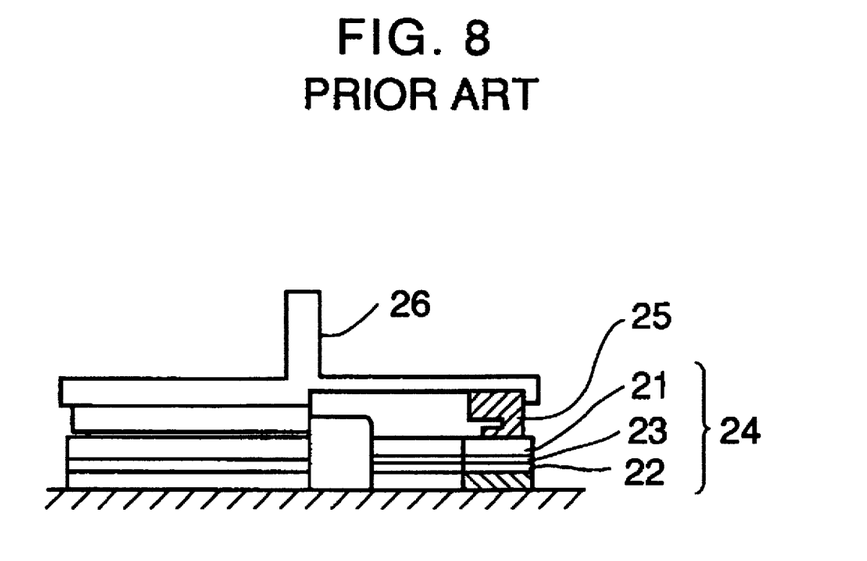
FIG. 8 is a sectional view of a conventional vibration wave driven motor.

A motor of the type being discussed has the following relationship between the elastic element 1 and the piezoelectric element 2. Referring to FIG. 8, such a motor includes a vibration member 24 comprising a metal elastic ring 21, a piezoelectric element 22, and an organic adhesive 23 (such as an epoxy or cyanoacrylate adhesive) with which the piezoelectric element 22 is attached to the elastic ring 21. The motor also includes a rotor 25 kept in press-contact with the sliding surface of the vibration member 24 by the force of a pressing spring, not shown, and an output shaft 26 integrated with the rotor 25.

When an AC voltage is applied to the piezoelectric element 22 from a two-phase power source, not shown, having a phase difference of $2/\pi$, a refracted traveling wave is generated in the vibration member 24, whereby each point on the sliding surface of the vibration member 24 undergoes an elliptical movement. The rotor 25, kept in press-contact with the sliding surface of the vibration member 24, is subjected to a force of friction between the vibration member 24 and the rotor 25, and rotates in the direction of the elliptical movement on the sliding surface of the vibration member 24. A member to be driven, not shown, is coupled with the output shaft 26 by a coupling or the like, and is driven by the torque of the rotor 25.

Such a motor utilizes the following principle: since a piezoelectric element expands and contracts by piezoelectric X-axis effect when a voltage is applied to the piezoelectric element, if the piezoelectric element is attached to an elastic element of a metal or the like, the elastic element can be bent in accordance with the expansion and contraction of the piezoelectric element.

As a result, the joint between the piezoelectric element and the elastic element is subjected to a relatively great shearing force when a tensile force (or compressive force) is transmitted from the piezoelectric element while resistance to the tensile or compressive force is transmitted from the elastic element.

Accordingly, the joint must possess a strength sufficient for withstanding such shearing force, a toughness sufficient for withstanding high-frequency stress (fatigue) repeatedly applied, and properties for effecting a uniform joining.

A vibration wave driven motor of the type being discussed has the following problems:

In the above-described vibration wave driven linear motor, because the rail-shaped stator 8 and the restricting members 9 are formed by working separate members into shapes elongated in the By direction, the stator 8 and the members 9 may be greatly deformed. It is difficult to form the sliding surface of the rail-shaped stator 8 and the guide surfaces of the restricting members 9 with such a high level of precision as to assure a sufficient flatness of these surfaces.

Further, the bottom plate 10, on which the rail-shaped stator 8 and the restricting members 9 are mounted, comprises a relatively thin plate. Therefore, the bottom plate 10 may also have an inherent deformation such as warpage.

When the restricting members 9 and the rail-shaped stator 8 are mounted on the plate 10, the deformation of the members 9, the stator 8 and the plate 10 may be serious.

As a result, the guide surfaces of the restricting members 9 on either side of the movable base 4 may have a poor level of parallelism, which causes variations in the inclination of the base 4 between various points of the movement of the base 4 in the By direction. These variations cause variations in the size of the gap between the sliding surface of the rail-shaped stator 8 and the base 4.

As described before, the elastic element 1 is mounted to the base 4 through the supporting members 6 and 7, and the spring 3 is also supported by the base 4. Therefore, when the gap between the sliding surface of the stator 8 and the base 4 varies between various points of movement in the $B_y$ direction, the pressing force applied to the elastic element 1 varies, making it impossible for the motor to exert a stable driving force. This is one problem.

In a vibration wave driven motor having a joint formed by the above-described method, since an organic adhesive is used in the joint between the piezoelectric element and the elastic element, the use of such an adhesive entails the problem of weak bonding strength, in particular, the risk of the bonding strength being greatly impaired by heat.

These problems may result in the following: When the amplitude of the vibration of the vibration member 24 is increased in order to increase the number of revolutions per unit time of the output, the adhesive layer 23 is subjected to an excessive shearing force, and the piezoelectric element 22 is separated from the elastic element 21. When the pressing force applied to the rotor 25 is increased and the input voltage (input power) is increased in order to achieve a great output (great torque), these increases simultaneously cause increases in the energy loss caused at the vibration member 24 and at the sliding portions, thereby increasing the heat generated from the motor; as a result, an increase in the temperature of the vibration member 24 causes a reduction in the bonding strength of the adhesive 23, which in turn causes the separation of the piezoelectric element 22, and hence, renders the motor unable to provide its proper function. Thus, the number of revolutions per unit time (the rotational speed) and the output torque of the motor can be increased to only a limited extent.

SUMMARY OF THE INVENTION

An object of the present invention is to overcome the above-described problems.

According to a first aspect of the present invention, a vibration driven motor or actuator includes a vibration member, first and second contact members, and an integrating member. The vibration member responds to an applied electrical signal for generating a vibration therein. The first contact member frictionally contacts the vibration member, and has a guide portion. The vibration generated in the vibration member effects relative movement between the vibration member and the contact member. A second contact member contacts the guide portion of the first contact member, and an integrating member integrates the second contact member with the vibration member.

According to another aspect of the present invention, a traveling wave driven motor has an oval-shaped vibration member, an electro-mechanical energy conversion member, a fixed contact member, a movable contact member and an integrating member. The electro-mechanical energy conversion member generates a traveling wave in the vibration member in response to an applied electrical signal. The fixed contact member frictionally contacts the vibration member, and has a guide portion extending in a predetermined direction. The traveling wave moves the vibration member relative to the fixed contact member. The movable contact member is guided through the guide portion of the fixed contact member. The integrating member integrates the movable contact member with the vibration member.

According to another aspect of the present invention, a vibration driven printing system has a vibration member, a first contact member, a carriage member, and an integrating member. The vibration member responds to an applied electrical signal for generating a vibration therein. The first contact member contacts the vibration member, and has a guide portion, wherein the vibration generated in the vibration member effects relative movement between the vibration member and the first contact member. The carriage member for a printing head has a second contact member guided through the guide portion of the first contact member. The integrating member integrates the second contact member of the carriage member with the vibration member.

The metal or alloy is required to possess the following properties: a melting point lower than both the melting point of the elastic element and the sublimation point of the piezoelectric element; properties for imparting good reaction between the metal or alloy, on one hand, and the materials forming the elastic and piezoelectric elements and the electrodes of the piezoelectric element, on the other (the elastic element may be made of a metal material and the piezoelectric element may be made of a ceramic material); and properties for imparting good bonding strength.

Examples which may be used as the metal or alloy include solders normally used to braze metals, these solders falling into alloys generally referred to as "hard solders" and those generally referred to as "soft solders". Usable examples of hard solders are: silver solders mainly containing silver (Ag), copper (Cu), tin (Sn) and cadmium (Cd); brass solders mainly containing silver, copper, tin and nickel (Ni); aluminum solders mainly containing aluminum (Al), copper, tin and silicon (Si); and gold solders mainly containing gold (Au), copper and silver. Usable examples of soft solders are ones mainly containing tin and lead (Pb).

These examples of alloys have a melting point of approximately from 180° to 320° C. in the case of a soft solder, and a melting point of approximately from 500° to 1000° C. in the case of a hard solder. On the other hand, since the lead component of the piezoelectric element starts evaporation at a temperature above 800° C., and the level of performance of the piezoelectric element may thus be deteriorated, a joining temperature below 800° C. is preferable. A joining temperature above 800° C. may be used, however, provided that the joining is performed in a saturated vapor atmosphere of lead, in which case the elastic element and the piezoelectric element can be joined without causing changes in the composition of the piezoelectric element.

Among the above-listed various types of solders, solders of the soft solder type and the aluminum solder type, which have melting points below 800° C., may be used in joining effected in a normal high-temperature furnace. However, some solders of the gold solder type, the silver solder type and the brass solder type have melting points above 800° C., and these solders must be used in joining effected in a saturated vapor atmosphere of lead.

DETAILED DESCRIPTION OF THE PREFERRED EMBODIMENTS

Figure 1:
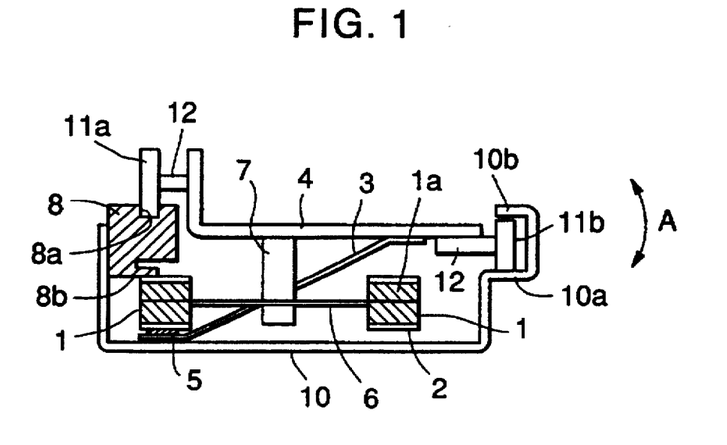
FIG. 1 is a sectional view of a first embodiment of a vibration wave driven motor according to the present invention.
Figure 2:
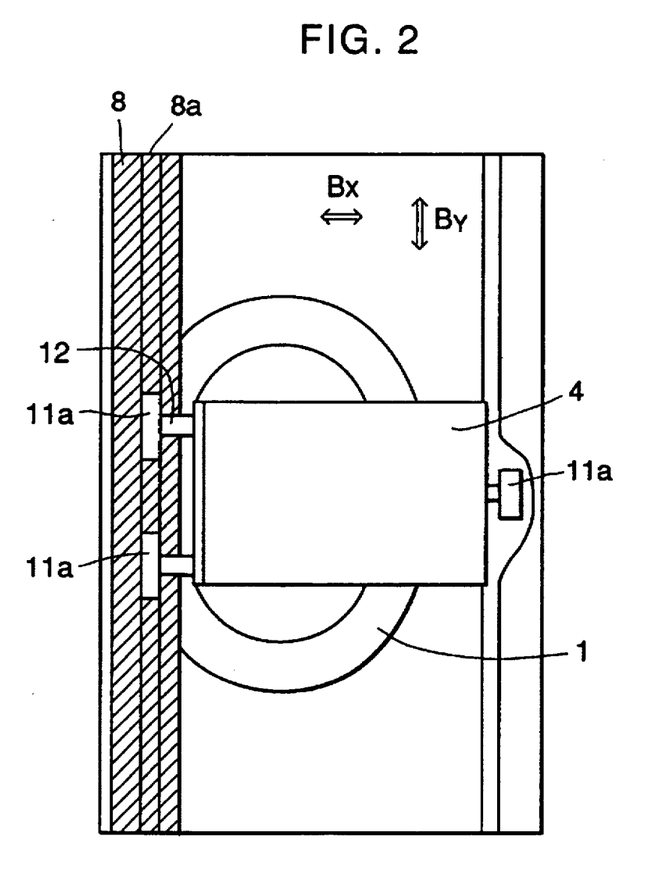
FIG. 2 is a plan view of the embodiment shown in FIG. 1.

FIGS. 1 and 2 show a first embodiment of the present invention applied to a bubble-jet printer having a known basic construction. A vibration wave driven motor according to the embodiment includes an elastic element i.e., a vibration member, 1 made of a metal and having an oval or elliptic configuration. The elastic element 1 has a plurality of comb-tooth shaped projections 1a integral with the body of the elastic element 1 and projecting upward therefrom, as viewed in FIG. 1. A piezoelectric element 2 is joined to the elastic element 1 in the manner described later. A supporting plate 6, having a suitable elasticity, has peripheral edge portions united with inner peripheral portions of the elastic element 1 by a spot welding method or the like. A central portion of the supporting plate 6 is supported by a supporting block 7 which is in turn fixed to a movable base 4 for a printing head, not shown. A pair of bearing shafts 12 extending in the direction $B_X$ are fixed at different positions in the direction $B_Y$ on a first side of the movable base 4. A roller 11a i.e., a second contact member, is rotatably mounted on the distal end of each bearing shaft 12. An integrating member is thus comprised of supporting plates 6, supporting blocking 7, movable base 4 and bearing shafts 12.

A rail-shaped stator 8 i.e., a first contact member, is fixed at a predetermined position on a first side of a bottom plate 10 i.e., a supporting member. The rail-shaped stator 8 has an upper surface formed with a recess 8a with which the rollers 11a are kept in engagement. The side of the rail-shaped stator 8 opposite the recess 8a i.e., a guide portion, is formed with a flange 8b having a suitable elasticity. The flange 8b has a lower surface constituting a sliding surface contacting a drive surface of the elastic element 1.

A pressing spring 3, comprising a plate spring, presses a portion of the elastic element 1 on the flange 8b of the rail-shaped stator 8. The pressing spring 3 extends obliquely from a position on the lower surface of the movable base 4 to a position on the lower surface of the elastic element 1 with the ends of the spring 3 being fixed to these positions.

A vibration insulator 5, such as a piece of felt, is interposed between the portion of the elastic element 1 and the associated end of the pressing spring 3 so that the urging force of the pressing spring 3 is transmitted to the elastic element 1 through the vibration insulator 5, whereby the portion of the elastic element 1 is kept in press-contact with the rail-shaped stator 8.

Thus, the rail-shaped stator 8 is held between the rollers 11a and the portion of the elastic element 1 by the urging force of the pressing spring 3. The rollers 11a engage with the recess 8a with a slight gap between the rollers 11a and the wall of the recess 8a so as to assure smooth movement in the $B_Y$ direction.

The other, or second, side of the bottom plate 10 includes a guide portion 10a i.e., a second guide portion, comprising a flat surface extending in the $B_Y$ direction. Another roller 11b ie., a third contact member, rotatably mounted on a bearing shaft 12 fixed to the movable base 4 is kept in contact with the guide portion 10a. The second side of the bottom plate 10 also includes a restricting portion 10b located above the guide portion 10a and extending parallel with the guide portion 10a. The restricting portion 10b is provided with a slight gap between the outer periphery of roller 11b and the inner periphery of the restricting portion 10b so as to restrict vertical displacement of the roller 11b.

With the above-described construction, when a high-frequency electric field is applied from a drive circuit, not shown, to the piezoelectric element 2, a traveling vibration wave is generated in the elastic element 1, and the elastic element 1, the movable base 4 and the members mounted to the base 4 all move integrally in the direction $B_Y$ along the recess 8a of the rail-shaped stator 8 under a frictional force due to friction between the elastic element 1 and the rail-shaped stator 8.

In this embodiment, the pressing force acting on the elastic element 1 is proportional to the distance (H) between the bottom surface of the recess 8a of the rail-shaped stator 8 (the surface on which the rollers 11a roll) and the sliding surface on the flange 8b of the rail-shaped stator 8.

Specifically, as the distance H increases, the displacement of the pressing spring 3 increases so that the pressing force of the spring 3 increases accordingly. On the other hand, a decrease in the distance H causes a decrease in the pressing force of the spring 3. Since the surfaces that determine the distance H are parts of the same member (the rail-shaped stator 8), the member can be formed with a high level of precision and, accordingly, the distance H between these surfaces can be determined highly precisely. Therefore, the movement of the movable base 4 in the direction $B_Y$ does not entail variations in the pressing force of the elastic element 1, and thus, a stable output is provided.

During the movement of the movable base 4, since the rollers 11a engage with the recess 8a of the rail-shaped stator 8 with a slight gap between the rollers 11a and the wall of the recess 8a, as described before, the displacement of the movable base 4 and the associated members in the $B_X$ direction is restricted. The roller 11b of the roller bearing provided on the other side of the movable base 4 which is remote from the rail-shaped stator 8 contacts the guide portion 10a with the vertical displacement of the roller 11b being restricted by the restricting portion 10b of the bottom plate 10, both the guide portion 10a and the restricting portion 10b being integral with the bottom plate 10. Thus, the movable base 4 is able to stably reciprocate in the direction $B_Y$ without rotating in the directions indicated by arrow A in FIG. 1.

Figure 3:
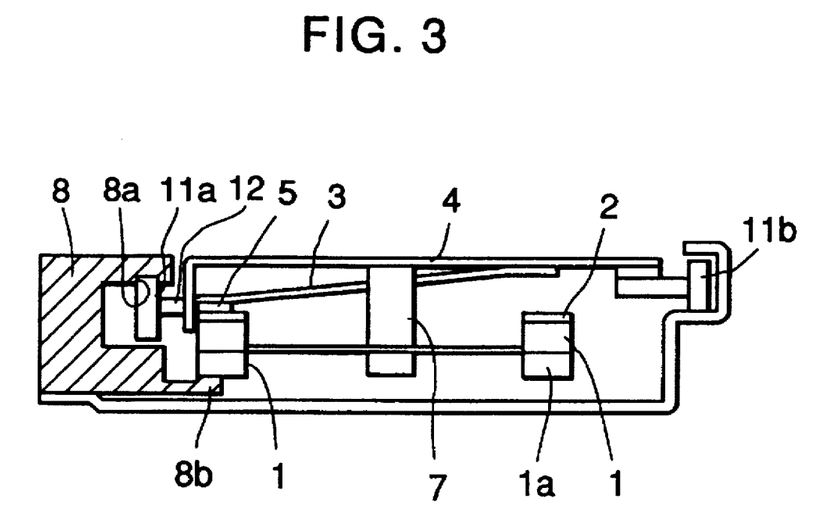
FIG. 3 is a sectional view of a second embodiment of the present invention.

FIG. 3 shows a second embodiment of the present invention.

The second embodiment is distinguished in the following: A rail-shaped stator 8 has a substantially U-shaped cross-sectional configuration. An upper surface of the rail-shaped stator 8 is formed with a recess 8a with which rollers 11a engage, and a flange 8b of the stator 8 protrudes from a position below the recess 8a and includes an upper surface constituting a contact surface contacting a portion of an elastic element 1. The elastic element 1 has a drive surface which is directed downward, as viewed in FIG. 3 (thus directed in the reverse direction when compared with the first embodiment) and which contacts the contact surface of the flange 8b of the rail-shaped stator 8. A pressing spring 3 is provided such that the portion of the elastic element 1 is pressed downward and the rollers 11a are pressed upward by the reaction force of the pressing spring 3. The second embodiment has a construction similar to that of the first embodiment on the side remote from the rail-shaped stator 8.

Figure 4:
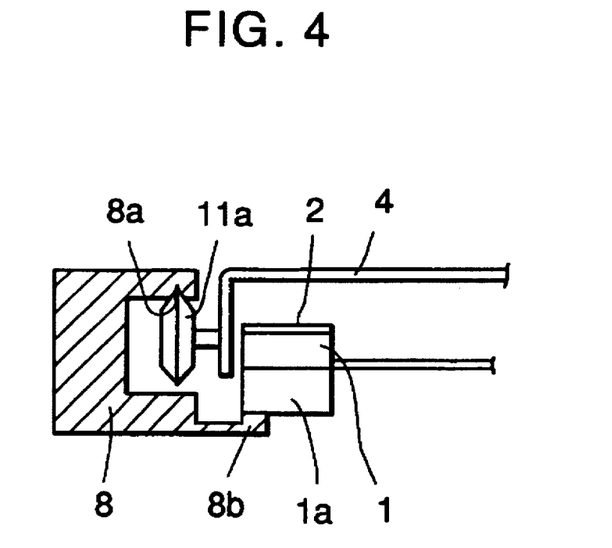
FIG. 4 is a fragmentary sectional view of a third embodiment of the present invention.

FIG. 4 shows a third embodiment of the present invention.

In the second embodiment shown in FIG. 3, the recess 8a formed in the rail-shaped stator 8 comprises a groove having a substantially U-shaped cross-sectional configuration, and the rollers 11a configured into a cylindrical shape are kept in engagement with the recess 8a. In contrast, the third embodiment is distinguished in that a recess 8a formed in a rail-shaped stator 8 has a substantially V-shaped cross-sectional configuration, and rollers 11a engaging with the V-shaped recess 8a are configured to include a V-shaped contour on the outer periphery thereof so that the rollers 11a fit in the recess 8a without any excessive play.

In each of the above-described embodiments, the rail-shaped stator 8, having a relatively complicated cross-sectional configuration can be formed at low costs and at a high level of precision if the material for forming the stator 8 comprises aluminum or the like which can be suitably extruded or drawn.

Next, the structure for joining an elastic element 1 and a piezoelectric element 2 according to the present invention will be described.

Figure 9:
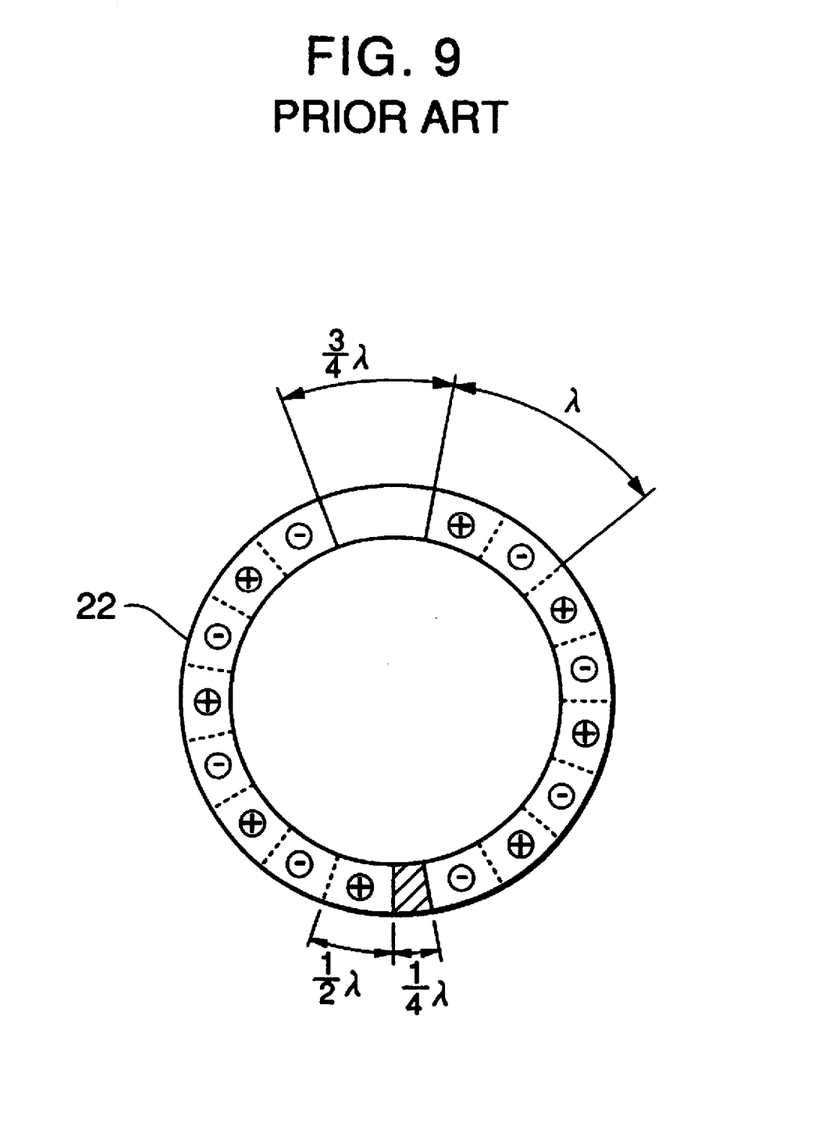
FIG. 9 is a plan view of a conventional piezoelectric element.

A vibration wave driven motor according to the present invention has a basic construction which is substantially the same as that of the conventional motor shown in FIG. 8. The vibration driven motor of the present invention includes a metal elastic ring 21 made of SUS420J2, and a piezoelectric element 22 having a piezoelectric ceramic ring comprising a commercially-available flat-plate ring having a thickness of 0.5 mm and made of a piezoelectric ceramic material of a three-component type mainly containing lead-titanate-zirconate. Nickel electrodes are formed by deposition on the two major surfaces of the ring into an electrode pattern such as that shown in FIG. 9.

In an example of forming a joint between the elastic element 21 and the piezoelectric element 22, an aluminum solder was used. The aluminum solder contained 3.5 to 4.5% of Cu, 9.5 to 10.5% of zinc (Zn), 9.5 to 10.5% of Si, and the balance of Al, and joining was effected in a furnace in a nitrogen atmosphere at a joining temperature of approximately 580° C. Since the piezoelectric ceramic material has a Curie-temperature of approximately 300° C., the polarization in the piezoelectric element 22 was effected after the completion of the joining. During the joining, a certain amount of the solder was divided into six pieces each having a thickness of 0.2 mm, a width of 2 mm and a length of 10 mm, and the solder pieces were arranged on the elastic element 1 at equal intervals. The piezoelectric element 22 were placed on the solder pieces, and a weight was placed on the piezoelectric element 22 so that the element 22 would not be displaced when the solder was molten.

In another example of forming a joint, in contrast with the above example in which an aluminum solder was used, a silver solder was used to form a joint between a piezoelectric element (including a ceramic ring) and an elastic element.

The silver solder contained 44 to 46% of Ag, 14 to 16% of Cu, 14 to 18% of Zn and 23 to 25% of Cd, and joining was effected in a furnace in a nitrogen atmosphere at a brazing temperature of approximately 800° C. Since a brazing temperature above 800° C. causes the lead component of the piezoelectric element to evaporate, the joining was effected while the interior of the furnace was filled with saturated vapor of lead. Since the brazing temperature is higher than the Curie-temperature of the piezoelectric element, the polarization in the piezoelectric element was effected after the completion of the brazing, as in the above example.

Another embodiment of a vibration wave drive motor according to the present invention includes an elastic element 1 comprising a sintered body formed by sintering a powder material.

Specifically, the elastic element 1 is formed from an iron-based material such that the element 1 has an increased density corresponding to a porosity below 20%.

The sintered-body elastic element 1 is joined to a piezoelectric element 2 including a ceramic ring by using pure copper, the joining being effected in a lead-vapor atmosphere at approximately 1100° C. corresponding to the melting point of lead. In this process, a part of the molten copper permeates into pores of the sintered-body elastic element 1 by a capillary phenomenon, and fills the pores. This is advantageous in that the resultant elastic element 1 has an improved vibration characteristic (Q value). In addition, since the solder uniformly spreads on the surface of joint between elastic element 1 and the piezoelectric element 2, uniform joining is possible.

If the joining uses a solder containing other metal mixed with copper, and the melting point is lowered so that joining is possible at a temperature lower than 800° C., joining can be effected in a nitrogen atmosphere. In this way, operability is improved while the Q value is improved.

When an alloy or metal is thus used to form a joint between a piezoelectric element and an elastic element, the joining temperature is substantially higher than the temperature at which the motor is actually used. Therefore, the piezoelectric element including a ceramic ring and the metal elastic element must have coefficients of thermal expansion that are as close as possible to each other. In this regard, the material for forming the joint should preferably have a coefficient of thermal expansion that is intermediate between the coefficients of thermal expansion of the piezoelectric element and the elastic element and is thus able to mitigate the stress caused by the difference between the coefficients of thermal expansion of these elements. A relatively great thickness of a layer formed by a molten metal or alloy is effective to mitigate such stress.

As has been described above, a vibration wave driven linear motor or actuator includes a movable base integral with an elastic element, and a rail-shaped stator integral with a guide portion for guiding base-guiding bearings, the guide portion comprising a bearing guide groove formed on a surface of the rail-shaped stator opposite the sliding surface of the stator. Therefore, the pressing force applied to the elastic element is maintained constant in spite of warpage of a base plate and the stator, thereby enabling the motor to provide a stable output.

Since the contact between the rail-shaped stator and the elastic element on their sliding surfaces is stable, it is possible to eliminate noise which might be generated from the motor during operation. Since the elastic element is joined to a piezoelectric element by melting a metal or alloy having a lower melting point than the elastic element, the piezoelectric element is prevented from separation even when the motor is used at relatively high temperatures. Thus, it is possible to obtain motor characteristics which are not temperature-dependent. If the elastic element comprises a sintered body formed by sintering a powder material, a part of the metal used to form the joint fills pores of the sintered body, thereby enabling both uniform joining between the elastic element and the piezoelectric element and improvement in the vibration characteristic of the elastic element.

What is claimed is:

1. A vibration driven motor or actuator comprising:
 (a) a vibration member responsive to an applied electrical signal for generating a vibration therein;
 (b) a first contact member frictionally contacting said vibration member, and comprising a guide portion, the vibration generated in said vibration member effecting relative movement between said vibration member and said first contact member, wherein said first contact member comprises a single member;
 (c) a second contact member contacted with said guide portion of said first contact member;
 (d) an integrating member for integrating said second contact member with said vibration member;
 (e) a supporting member for supporting said first contact member, and comprising a second guide portion; and
 (f) a third contact member arranged in contact with said second guide portion of said supporting member.

2. A vibration driven motor or actuator according to claim 1, wherein said second contact member comprises a roller movable along said guide portion of said first contact member.

3. A vibration driven motor or actuator according to claim 1, wherein said integrating member comprises an urging element for pressing said vibration member against said first contact member so that said guide portion of said first contact member contacts said second contact member.

4. A vibration driven motor or actuator according to claim 3, wherein said urging element comprises a spring element.

5. A vibration driven motor or actuator according to claim 1, wherein said guide portion comprises a recess extending in a predetermined direction.

6. A vibration driven motor or actuator according to claim 1, wherein said first contact member comprises a flange protruding therefrom opposite from said guide portion.

7. A vibration driven motor or actuator according to claim 6, wherein said recess comprises a substantially U-shaped channel.

8. A vibration driven motor or actuator according to claim 6, wherein said recess comprises a substantially V-shaped channel.

9. A vibration driven motor or actuator according to claim 1, wherein said guide portion of said first contact member is located on an opposite surface from a contact surface of said first contact member.

10. A vibration driven motor or actuator according to claim 1, wherein said vibration member includes an oval elastic element.

11. A traveling wave driven motor comprising:
 (a) an oval-shaped vibration member;
 (b) an electro-mechanical energy conversion member for generating a traveling wave in said vibration member in response to an applied electrical signal;
 (c) a fixed contact member frictionally contacting said vibration member, and comprising a guide portion extending in a predetermined direction, the traveling wave moving said vibration member relative to said fixed contact member, wherein said fixed contact member comprises a single member;
 (d) a movable contact member guided through said guide portion of said fixed contact member;
 (e) an integrating member for integrating said movable contact member with said vibration member;
 (f) a supporting member for supporting said fixed contact member, and comprising a second guide portion extending in said predetermined direction; and
 (g) a second movable contact member guided through said second guide portion of said supporting member.

12. A motor according to claim 11, wherein said movable contact member comprises a roller movable along said guide portion of said fixed contact member.

13. A motor according to claim 11, wherein said integrating member comprises an urging element for pressing said vibration member against said fixed contact member so that said guide portion of said fixed contact member contacts said movable contact member.

14. A vibration driven printing system comprising:
 (a) a vibration member responsive to an applied electrical signal for generating a vibration therein;
 (b) a first contact member contacting said vibration member, and comprising a guide portion, the vibration generated in said vibration member effecting relative movement between said vibration member and said first contact member, wherein said first contact member comprises a single member;
 (c) a carriage member for a printing head, said carriage member comprising a second contact member guided through said guide portion of said first contact member;
 (d) an integrating member for integrating said second contact member of said carriage member with said vibration member;
 (e) a supporting member for supporting said first contact member, and comprising a second guide portion; and
 (f) a third contact member arranged in contact with said second guide portion of said supporting member.

15. A printing system according to claim 14, wherein said printing system comprises a thermal jet-type printing system.

16. A vibration driven motor or actuator according to claim 5, wherein said first contact member comprises a flange protruding therefrom opposite from said guide portion.

17. A vibration driven motor or actuator according to claim 16, wherein said recess comprises a substantially U-shaped channel.

18. A vibration driven motor or actuator according to claim 16, wherein said recess comprises a substantially V-shaped channel.

* * * * *

UNITED STATES PATENT AND TRADEMARK OFFICE
CERTIFICATE OF CORRECTION

PATENT NO. : 5,698,929
DATED : December 16, 1997
INVENTOR(S) : HIROYUKI SEKI, ET AL.

It is certified that error appears in the above-identified patent and that said Letters Patent is hereby corrected as shown below: On title page,

Item [56] References Cited

U.S. PATENT DOCUMENTS

"Mukobjima et al." should read --Mukohjima et al.--.
"Seski et al." should read --Seki et al.--.

FOREIGN PATENT DOCUMENTS

"3155375" should read --3-155375--.

Column 2

Line 3, "moment" should read --movement--.

Column 3

Line 8, "By" should read --$B_Y$--.

UNITED STATES PATENT AND TRADEMARK OFFICE
CERTIFICATE OF CORRECTION

PATENT NO. :  5,698,929

DATED      :  December 16, 1997

INVENTOR(S) :

HIROYUKI SEKI, ET AL.

It is certified that error appears in the above-identified patent and that said Letters Patent is hereby corrected as shown below:

<u>Column 7</u>

Line 58, "were" should read --was--.

<u>Column 8</u>

Line 28, "of" should read --of the--.
    Line 30, "metal" should read --metals--.

Signed and Sealed this

Sixteenth Day of June, 1998

Attest:

BRUCE LEHMAN

Attesting Officer      Commissioner of Patents and Trademarks